United States Patent
Gu et al.

(10) Patent No.: US 10,388,069 B2
(45) Date of Patent: Aug. 20, 2019

(54) METHODS AND SYSTEMS FOR LIGHT FIELD AUGMENTED REALITY/VIRTUAL REALITY ON MOBILE DEVICES

(71) Applicant: Futurewei Technologies, Inc., Plano, TX (US)

(72) Inventors: Jinwei Gu, Princeton, NJ (US); Bennett Wilburn, San Jose, CA (US); Wei Jiang, Princeton, NJ (US)

(73) Assignee: Futurewei Technologies, Inc., Plano, TX (US)

(*) Notice: Subject to any disclaimer, the term of this patent is extended or adjusted under 35 U.S.C. 154(b) by 521 days.

(21) Appl. No.: 14/848,759

(22) Filed: Sep. 9, 2015

(65) Prior Publication Data
US 2017/0069133 A1 Mar. 9, 2017

(51) Int. Cl.
*G06T 19/00* (2011.01)

(52) U.S. Cl.
CPC ........ *G06T 19/006* (2013.01); *G06T 2200/21* (2013.01)

(58) Field of Classification Search
CPC ..... G06T 17/00; G06T 15/205; G06T 19/006; G06T 2200/21; G06T 2210/56; G06T 15/00; G06T 19/00; G06T 2207/10052; H04N 13/0014
See application file for complete search history.

(56) References Cited

U.S. PATENT DOCUMENTS

| | | | |
|---|---|---|---|
| 2004/0104935 A1 | 6/2004 | Williamson et al. | |
| 2010/0245260 A1 | 9/2010 | Louch | |
| 2012/0013616 A1* | 1/2012 | Uesaki | H04N 13/0275 345/419 |
| 2012/0249730 A1* | 10/2012 | Lee | G06T 17/00 348/38 |
| 2012/0256950 A1* | 10/2012 | Masuda | G06F 19/3418 345/629 |
| 2013/0321564 A1 | 12/2013 | Smith et al. | |

(Continued)

FOREIGN PATENT DOCUMENTS

| | | |
|---|---|---|
| CN | 102147658 A | 8/2011 |
| CN | 102668556 A | 9/2012 |

(Continued)

OTHER PUBLICATIONS

Author: Siu et al.; Title: Image-based Modeling and Rendering with Geometric Proxy; Date: 2004; pp. 4 Source: http://www.cs.cityu.edu.hk/~rynson/papers/mm04b.pdf.*

(Continued)

*Primary Examiner* — Jwalant Amin
(74) *Attorney, Agent, or Firm* — Conley Rose, P.C.

(57) ABSTRACT

Methods and apparatus are described that enable augmented or virtual reality based on a light field. A geometric proxy of a mobile device such as a smart phone is used during the process of inserting a virtual object from the light field into the real world images being acquired. For example, a mobile device includes a processor and a camera coupled to the processor. The processor is configured to define a view-dependent geometric proxy, record images with the camera to produce recorded frames and, based on the view-dependent geometric proxy, render the recorded frames with an inserted light field virtual object.

16 Claims, 5 Drawing Sheets

(56) References Cited

U.S. PATENT DOCUMENTS

| | | | |
|---|---|---|---|
| 2014/0321702 A1 | 10/2014 | Schmalstieg | |
| 2015/0062120 A1* | 3/2015 | Reisner-Kollmann | ........................ G06T 19/006 345/419 |
| 2015/0109339 A1 | 4/2015 | Jin | |
| 2016/0255333 A1 | 9/2016 | Nisenzon et al. | |

FOREIGN PATENT DOCUMENTS

| | | |
|---|---|---|
| CN | 103577788 A | 2/2014 |
| CN | 104685860 A | 6/2015 |
| WO | 2015031854 A2 | 3/2015 |

OTHER PUBLICATIONS

Partial English Translation and Abstract of Chinese Patent Application No. CN102147658, Aug. 10, 2011, 13 pages.

Kurashima, C., et al., "Combining Approximate Geometry with View-Dependent Texture Mapping—A Hybrid Approach to 3D Video Teleconferencing," Proceedings of the XV Brazilian Symposium on Computer Graphics and Image Processing, 2002, 8 pages.

Foreign Communication From a Counterpart Application, PCT Application No. PCT/CN2016/098538, English Translation of International Search Report dated Nov. 30, 2016, 4 pages.

Bolas, Mark, et al., "Creating Near-Field VR Using Stop Motion Characters and a Touch of Light-Field Rendering," SIGGRAPH 2015 Posters, Aug. 9-13, 2015, Los Angeles, CA, ACM 978-1-4503-3632-Jan. 15, 2008, 1 page.

Chuang, Yung-Yu, et al., "Environment Matting Extensions: Towards Higher Accuracy and Real-Time Capture," SIGGRAPH '00, Proceedings of the 27th Annual Conference on Computer Graphics and Interactive Techniques, 2000, pp. 121-130.

Davis, Abe, et al., "Unstructured Light Fields," EUROGRAPHICS 2012, vol. 31, No. 2, 2012, 10 pages.

Engle, Jakob, et al., "LSD-SLAM: Large-Scale Direct Monocular SLAM," Computer Vision—ECCV 2014, Lecture Notes in Computer Science, vol. 8690, 2014, pp. 834-849.

Hartley, Richard, et al., "Multiple View Geometry in Computer Vision," Second Edition, Cambridge University Press, 2003, pp. 1-673.

Pinies, Pedro, et al., "Inertial Aiding of Inverse Depth SLAM using a Monocular Camera," 2007 IEEE International Conference on Robotics and Automation, Roma, Italy, Apr. 10-14, 2007, pp. 2797-2802.

Wetzstein, Gordon, et al., "Tensor Displays: Compressive Light Field Synthesis using Multilayer Displays with Directional Backlighting," SIGGRAPH 2012, ACM Transactions on Graphics 31(4), 2012, 11 pages.

Zhang, Zhengyou, "A Flexible New Technique for Camera Calibration," Technical Report MSR-TR-98-71, IEEE Transactions on Pattern Analysis and Machine Intelligence, 22(11):1330-1334, 2000, Dec. 2, 1998, 22 pages.

Szeliski, R., et al., "Computer Vision:Algorithms and Applications", Chapter 2 Image formation, XP055455857, Sep. 3, 2010, 74 pages.

Foreign Communication From a Counterpart Application, European Application No. 16843678.0, Extended European Search Report dated Mar. 12, 2018, 12 pages.

* cited by examiner

METHODS AND SYSTEMS FOR LIGHT FIELD AUGMENTED REALITY/VIRTUAL REALITY ON MOBILE DEVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Augmented reality (AR) is a technology that superimposes a computer-generated image on a user's view of the real world, thus providing a composite view. Virtual reality (VR) is a technology by which a user interactively explores a computer-generated environment typically through the use of goggles. Some AR and VR systems require computer-generated (CG) or scanned three dimensional (3D) objects to be inserted into a video sequence. Often CG-generated or scanned 3D objects have fairly limited realism. Further, the design and creation of CG-generated 3D content is labor-intensive. Another drawback is captured panoramic videos only permit users to rotate their heads, but not move freely around a room.

SUMMARY

Methods and apparatus are described that enable augmented or virtual reality based on a light field. A view-dependent geometric proxy of a mobile device such as a smart phone is used during the process of inserting a virtual object from the light field into the real world images being acquired. For example, a mobile device includes a processor and a camera coupled to the processor. The processor is configured to define a view-dependent geometric proxy, record images with the camera to produce recorded frames and, based on the view-dependent geometric proxy, render the recorded frames with an inserted light field virtual object.

In another embodiment, a non-transitory storage device including instructions which, when executed by a processor, cause the processor to determine a view-dependent geometric proxy for a mobile device as the mobile device moves in three dimensional (3D) space, receive video frames recorded by a camera, and based on the view-dependent geometric proxy, render the recorded frames on a display with an inserted light field virtual object.

In yet another embodiment, an augmented or virtual reality method includes receiving, via a user interface, a location as to where to insert a light field object in images captured by a mobile camera and recording video with the mobile camera to produce recorded video frames. The method further includes, based on a view-dependent geometric proxy defined for the mobile camera, rendering the recorded video frames with an inserted light field virtual object.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for generating augmented reality (AR) or virtual reality (VR) images, both static photos and video. The disclosed embodiments include the use of a light field to render AR or VR images. Through the use of, for example, a mobile camera such as a smart phone, a user can easily insert one or more light field objects anywhere in a video image currently being captured by the mobile camera. Further, the user can move with the mobile camera freely in space to perceive the light field video content rendered in the AR or VR images on the mobile camera from different positions and angles.

Figure 1:
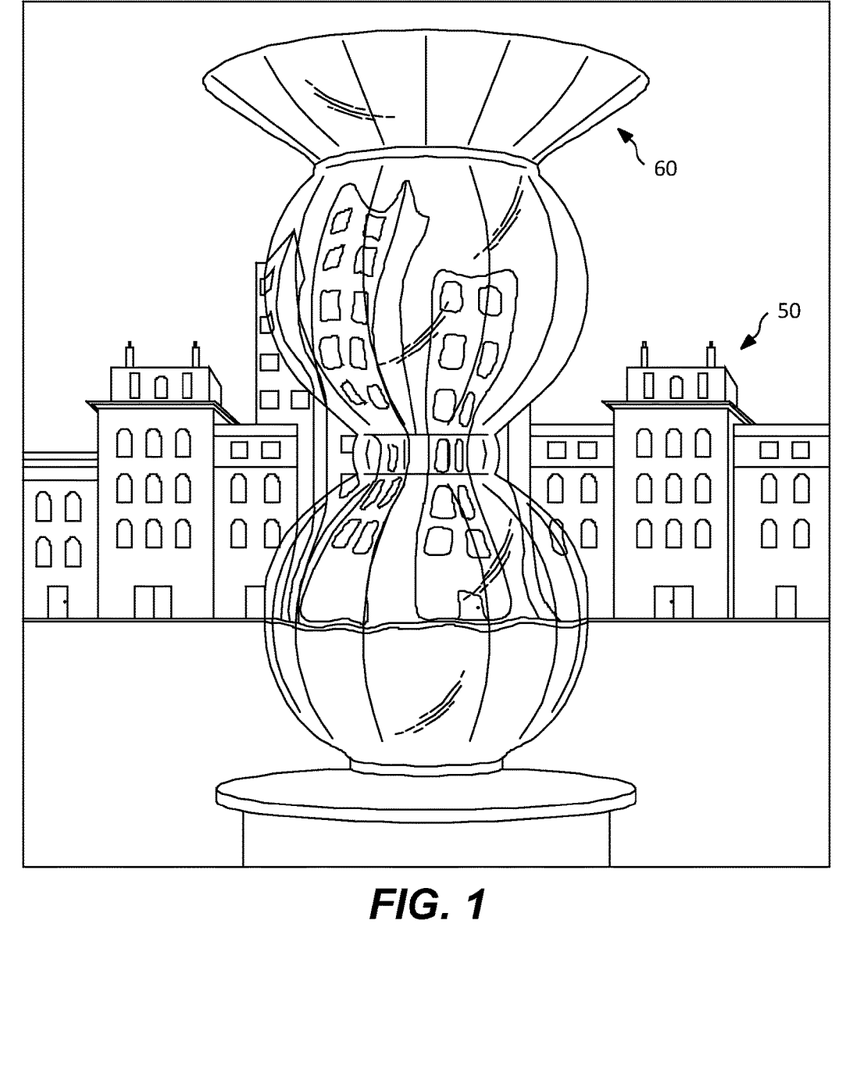
FIG. 1 is an example of an augmented reality video frame image in accordance with various embodiments.

As a result, a real world image can be captured by the mobile camera such as that shown in FIG. 1. The real world image is the actual image being captured by the camera and the light field object is superimposed into the real world image thereby producing the AR or VR effect. FIG. 1 shows an example of a real world image 50 captured by a camera of a mobile device. A light field object 60 was separately acquired through prior use of the same mobile camera or by other cameras and rendered into the real world image as shown on a display of the mobile camera itself, or on a separate display.

The mobile camera used to capture the real world images and embed light field objects may include smart phones as mentioned above, as well as tablet computers, computer eye-worn glasses, goggles, laptop computers, digital cameras, and the like. Furthermore, the mobile camera may be part of any portable electronic device having a camera in communication with a processor. Such devices generally have image capture devices (e.g., cameras), processors, memory, displays (e.g., touch displays), and other components. The rendering of the AR or VR images using the light fields may be performed by the device's processor executing software. In various embodiments, rendering of the AR or VR images using the light fields may be performed by software, firmware, hardware, or any combination thereof.

For ease of explanation, the following explanation is presented in terms of rendering augmented reality video. However, embodiments include rendering virtual reality video as well as AR or VR static images.

Figure 2:
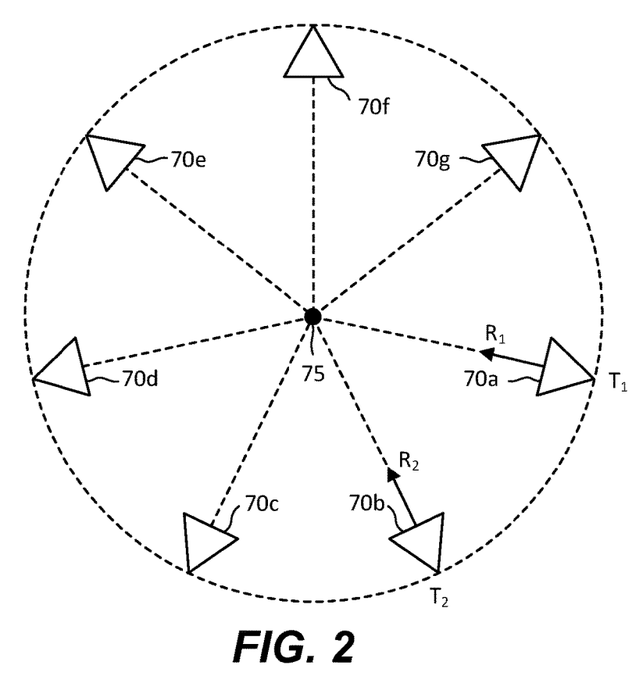
FIG. 2 is an example of the generation of a light field using a circular array of light field cameras in accordance with various embodiments.

A light field is a collection of images taken of an object in a 3D scene from different viewpoints. For example, FIG. 2 illustrates a circular array of light field cameras 70 (70a, 70b, 70c, 70d, 70e, 70f, and 70g). Each camera 70 is schematically represented by a triangle. Each light field camera 70 points inward towards the center 75 of the circular array. A physical object may be placed at the center point 75 and thus each camera 70 captures static or video images of that object from a different location and angle. The location of each camera is designated as "T" and may be given as an x, y, z coordinate relative to an origin (e.g., point 75). For example, camera 70a is positioned at location $T_1$ while camera 70 is positioned at location $T_2$. Each camera is pointed generally at the object at center point 75. Because each camera 70 is at a different location T, each camera has a different orientation angle. Orientation angle is designated herein as "R" and may be given in terms of, for example, pitch, roll, and yaw angles. Camera 70a has an orientation angle $R_1$ and camera 70b has an orientation angle of $R_2$. The example of FIG. 2 shows seven light field cameras, but in general there are i (i is a number preferably greater than 1) light field cameras and each camera as a location $T_i$ and an orientation angle of $R_i$. In some embodiments, the light field image from each light field camera 70 may be a video or static photograph, while in other embodiments, the light field images are video sequences.

Figure 3:
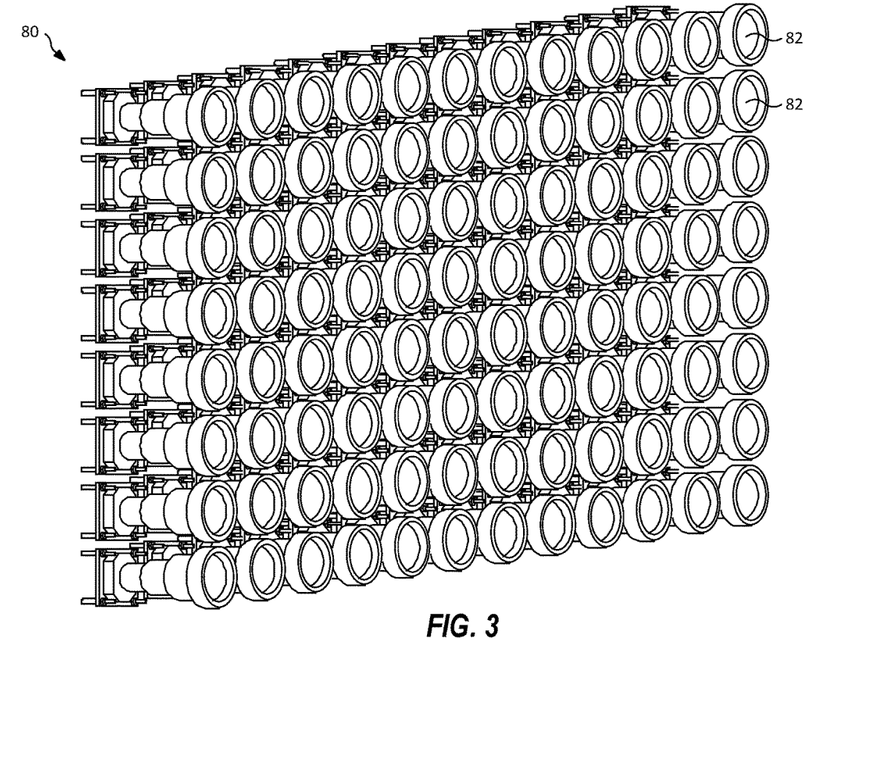
FIG. 3 is an example of the generation of a light field using a two-dimensional array of light field cameras in accordance with various embodiments.

FIG. 3 illustrates a two-dimensional (2D) camera array 80 for generating a light field. The cameras 82 in array 80 may be the same or similar cameras as in the circular array of FIG. 2 but arranged in a 2D array instead. As in the example of FIG. 2, each camera has a location $T_i$ and an orientation $R_i$.

In another example, a single camera can be used to produce the light field images by a user acquiring an image from the camera at one location, then moving the camera to another location, acquiring a new image, and so on.

The light field cameras 70, 82 used to produce the light field image may be the same types of cameras noted above for the mobile camera used to capture the real world image, that is, smart phones tablet computers, computer eye-worn glasses, goggles, laptop computers, digital cameras, etc. In the embodiment in which a single camera is used to capture the light field (through movement of the camera from location to location), the same camera (e.g., same smart phone) can be used to capture the light field images as well as the real world images into which the light field object shown in the light field images is to be rendered. The user may acquire and store multiple sets of light field objects in the memory of the mobile camera used to capture the real world images. Alternatively, the light field objects may be captured by the user and uploaded for storage to an on-line storage service, and subsequently downloaded to the mobile device to generate the AR or VR images. In yet other embodiments, the user of the mobile device use to generate the AR or VR images does not generate his or her own light field images, and instead uses previously recorded light field images downloaded to the user's mobile camera or device from, for example, an on-line service.

By way of terminology, the device used to capture the real world image into which the light field object is to be inserted is referred to as a mobile camera, while the cameras used to capture the light field object itself are referred to as light field cameras. As noted above, the same camera device can be used both to capture the real world image as well as the light field images.

As noted above, the embodiments described herein use a "geometric proxy" for on-device light field AR/VR rendering. A geometric proxy is associated with the mobile camera used to capture the real world video into which the light field object is to be inserted. A geometric proxy can be a plane, a cylinder, or a surface with scene depth. The geometric proxy is view-dependent meaning that its orientation depends on the location and orientation angle of the mobile camera used to capture the real world video. The example of a geometric proxy being a plane is used below for ease of explanation but the geometric proxy can be numerous other shapes.

A plane can be defined, in part, by a vector that is normal to the surface of the plane. As the angular orientation of the plane changes, so does the angular orientation of the normal vector. The geometric proxy is considered to be located at a particular point in 3D space as specified by a user of the mobile camera. As the user moves the mobile camera about the space and changes the angle and location of the mobile camera, the geometric proxy plane changes its angle so as to directly face the camera. As such, in some embodiments the geometric proxy is a plane that is represented by (n,d) where n is the 3D normal of the plane and d is the distance between the plane and the mobile camera.

Any suitable technique can be implemented by the mobile camera to compute (n,d) at each point in time as the camera is moved about by the user. For example, any of variety of Simultaneous Localization And Mapping (SLAM) techniques can be used for this purpose. One suitable SLAM technique uses an inertial measurement unit and is described in "Inertial Aiding of Inverse Depth SLAM Using a Monocular Camera," Pinies et. al., IEEE International Conference on Robotics and Automation, Roma, Italy, 10-14 Apr. 2007. In that technique, an inertial measurement unit (IMU) such as a gyroscope and/or an accelerometer is used to aid the determination of the mobile camera's position, rotation and velocity. The IMU provides measurements of its own acceleration and angular velocity at relatively high update rates. From those measurements, position, velocity and angular orientation of the mobile camera can be calculated by way of integration. The mobile camera computes its geometric proxy based, in part, on sensor signals from the IMU as well as captured images by an image capture device.

The camera's position, velocity and angular orientation and a map with the most relevant feature locations of the environment are estimated using relative information between the camera and each feature in the 3D space. The state vector to be estimated is then given by:

$$x(k) = \begin{bmatrix} x_v(k) \\ Y(k) \end{bmatrix}$$

where $x_v(k)$ represents the vehicle state $$x_v(k) = \begin{bmatrix} r^n(k) \\ v^n(k) \\ \psi^n(k) \\ f^b_{bias}(k) \\ \omega^b_{bias}(k) \end{bmatrix}$$

and $Y(k)$ is the set of n features in the map $$Y(k) = \begin{bmatrix} y_1(k) \\ \vdots \\ y_n(k) \end{bmatrix}$$

The components of the features $y_i(k)$ are described below. The vehicle state $x_v(k)$ contains the three cartesian coordinates of the camera's position $r^n$, velocity $v^n$ and attitude in Euler angles $\psi^n$, all of them represented with respect to the navigation frame N and the bias in the accelerometers $f^b_{bias}$ and gyros $\omega^b_{bias}$ in the camera's body frame B.

The dynamic evolution of the state in time is given by a non-linear state transition function:

$$x(k+1) = f(x(k), u(k), w(k))$$

where the input $u(k)$ encloses the body-frame reference accelerations $f^b(k)$ and angular velocities $\omega^b(k)$ measured by the IMU $$u(k) = \begin{bmatrix} f^b(k) \\ \omega^b(k) \end{bmatrix}$$

and the term $w(k)$ represents the noise in those measurements as a zero mean uncorrelated Gaussian noise with covariance Q $$w(k) = \begin{bmatrix} \delta f^b(k) \\ \delta \omega^b(k) \end{bmatrix}$$

The evolution of the camera state given the previous input and noise can be calculated using the following equations:

$$x_v(k) = \begin{bmatrix} r^n(k+1) \\ v^n(k+1) \\ \psi^n(k+1) \\ f^b_{bias}(k+1) \\ \omega^b_{bias}(k+1) \end{bmatrix} =$$

-continued $$\begin{bmatrix} r^n(k) + v^n(k+1)\Delta t \\ v^n(k) + [C^n_b(k)[(f^b(k) + \delta f^b(k)) - f^b_{bias}(k)] + g^n]\Delta t \\ \psi^n(k) + E^n_b[(\omega^b(k) + \delta \omega^b(k)) - \omega^b_{bias}(k)]\Delta t \\ f^b_{bias}(k) \\ \omega^b_{bias}(k) \end{bmatrix}$$

where $C_b^n(k)$ and $E_b^n$ and are the direction cosine matrix and rotation rate transformation matrix, respectively. The biases are assumed to be constant and affected by gaussian noise.

In some embodiments, the representation of the 3D features is over-parameterized as follows:

$$y_i = \begin{bmatrix} r^n_i \\ \theta^n_i \\ \phi^n_i \\ \rho^n_i \end{bmatrix}$$

where $r_i^n$ represents the camera optical center, in cartesian coordinates, from where the feature was first observed. The angles $\theta_i^n$, $\phi_i^n$ define the azimuth and elevation of the ray that goes from the initial camera position to the 3D point feature. Finally, $\rho_i^n = 1/d_i$ is the inverse of the distance $d_i$ between that camera position and the feature.

In some examples, the observations are related to the state by:

$$z_i = \begin{bmatrix} \arctan\left(\frac{h^c_y}{h^c_x}\right) \\ \arctan\left(\frac{h^c_z}{\sqrt{(h^c_x)^2 + (h^c_x)^2}}\right) \end{bmatrix} + v$$

where $[h_x^c, h_y^c, h_z^c]^T$ are the components of the vector $h^c$ which defines the ray that goes from the current camera position to the 3D point in camera coordinates ($^c$) and v is the uncorrelated, zero-mean Gaussian observation noise with covariance R.

The following equations illustrate how to calculate the ray $h^c$ from the components of the camera state $x_v$ and the corresponding feature $y_i$. The term $r_{bc}^b$ is the sensor offset from the inertial measured in the body frame and the matrix $C_b^c$ is the transformation matrix from the body frame to the camera frame.

$$h^c = C_b^c C_n^b h^n$$

$$h^n = (r_i^n + \frac{1}{\rho_i^n} m(\theta_i^n, \phi_i^n) - (r^n + C_b^n r_{bc}^b)$$

The vector m is a unitary vector that describes the direction of the ray when the feature was seen for the first time. It can be calculated from the azimuth $\theta_i^n$ and elevation $\phi_i^n$ angles of the feature by:

$$m(\theta_i^n, \phi_i^n) = \begin{bmatrix} \cos(\theta_i^n)\cos(\phi_i^n) \\ \sin(\theta_i^n)\sin(\phi_i^n) \\ \sin(\phi_i^n) \end{bmatrix}$$

After applying an undistortion process to the points interest in the image a pinhole camera model is used to determine the azimuth and elevation angles in the camera from the pixel coordinates (u, v) of the feature:

$$\begin{bmatrix} \theta_i^c \\ \varphi_i^c \end{bmatrix} = \begin{bmatrix} \arctan\left(\frac{u-u_0}{f_u}\right) \\ \arctan\left(\frac{v-v_0}{f_v}\right) \end{bmatrix}$$

where $u_0, v_0$ are the center coordinates in the image and $f_u, f_v$ are the components of the focal length.

As the mobile camera is moved about a space while capturing video images, for each frame of video, the mobile camera determines the camera's location and orientation angle (T and R) using the technique described above, or another technique. In other embodiments, the mobile camera may determine the camera's location and orientation angle less frequently than for each video frame (once every 10 video frames). The location and orientation angle of the mobile camera changes over time as the camera is moved and thus the camera's location and orientation angle is represented as T(t) and R(t) to indicate that the location and orientation angle vary with respect to time, t.

To summarize to this point, a set of light field images of a physical object are acquired and stored or otherwise used for subsequent rendering to video of a real word image acquired by a mobile camera. The location $T_i$ and an orientation angle of $R_i$ of each light field camera i is recorded as well along with the light field images. During acquisition by the mobile camera of a real world scene into which the light field object is to be inserted, the camera's location T(t) and orientation angle R(t) are recorded. The user of the mobile camera specifies where in 3D space the user wants the light field object to be inserted. The user may specify that location by inputting a distance value into the mobile camera while pointing the mobile camera at the real world scene of interest. For example, the user may specify a distance of 5 feet meaning that the light field object is to be inserted and rendered so as to appear to be 5 feet directly in front of the mobile camera's lens. If the mobile camera is a smart phone, the user may enter the distance of the light field object using the touch sensitive display of the smart phone.

Figure 4:
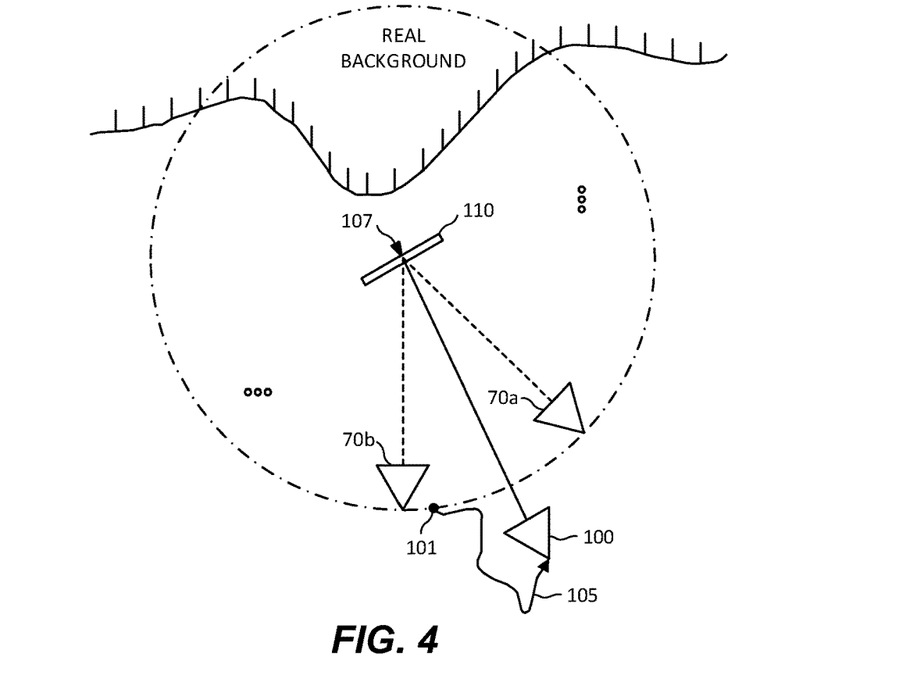
FIG. 4 illustrates the movement of a mobile camera in relation to the light field generating cameras in accordance with various embodiments.

Once the mobile camera is made aware of where the user wants the light field object to be located in the real world scene to be acquired, the mobile camera computes a modified version of one or more of the light field images based on the mobile camera's geometric proxy. FIG. 4 illustrates the concept of the mobile camera 100 positioned initially at location 101 and moving along camera trajectory 105 while acquiring video images of an object located at point 107. The geometric proxy 110 of the mobile camera 100 is also located at point 107 and is computed by camera 100 to have a variable orientation angle based on the movement of camera 100. The current orientation angle of the geometric proxy 110 is such that it faces directly towards the current location of mobile camera 100.

FIG. 4 also shows a circular array of light field cameras 70 superimposed on top of the real world scene being acquired by mobile camera 100 to illustrate the relationship between the light field images previously acquired by cameras 70 and the real world image being acquired by mobile camera 100. Of course, the light field cameras 70 are not literally superimposed in the image being acquired by the mobile camera 100. The center point of the circular array of cameras is considered to be coincident with the location of the camera's geometric proxy 110. Thus, each light field camera 70 (e.g., 70a and 70b) are shown in their location and orientation angle as they would have been had they been positioned to acquire light field images of an object placed at point 107. As explained above, a location $T_i$ and an orientation angle $R_i$ is recorded for each light field camera 70a, 70b, etc. Similarly, location T(t) and orientation angle R(t) data are recorded for the mobile camera 100 as it moves along camera trajectory 105. Those location and orientation angle values as well as the surface normal n(t) and distance d(t) of the geometric proxy 110 are used to compute a transformation for each of one or more light field views that are within a predetermined range of the mobile device's current location. In the example of FIG. 4, light field cameras 70a, 70b are closest to the mobile camera 100 and thus the light field images from those two cameras at the current point in time are transformed according to the following transformation:

$$H_i(t) = K_i * [R_i * R(t)^{-1} - (T_i - R_i * R(t)^{-1} * T(t)) * (R(t) * n(t))^T / (d(t) - ((R(t) * n(t))^T * T(t)))] * K^{-1}$$

where:
  $K_i$ denotes the intrinsic camera matrix of the $i^{th}$ light field camera (camera 70a or 70b in this example);
  $R_i$ denotes the 3D orientation angle of the $i^{th}$ light field camera;
  $T_i$ denotes the 3D location of the $i^{th}$ light field camera;
  R(t) denotes the 3D orientation angle of the mobile camera 100;
  T(t) denotes the 3D location of the mobile camera 100;
  n(t) denotes the normal of the plane of the geometric proxy 110;
  d(t) denotes the distance between the geometric proxy 110 and the mobile camera's current location. The values n(t) and d(t) define the position and orientation of the geometric proxy.

The intrinsic camera matrix $K_i$ is a 3×3 upper-triangular matrix that describes the camera's internal parameters. The intrinsic matrix contains 5 intrinsic parameters. These parameters include focal length, image sensor format, and principal point. An example of an intrinsic matrix is provided below:

$$A = \begin{bmatrix} \alpha_x & \gamma & u_0 \\ 0 & \alpha_y & v_0 \\ 0 & 0 & 1 \end{bmatrix}$$

The parameters $\alpha_x = f \cdot m_x$ and $\alpha_y = f \cdot m_y$ represent focal length in terms of pixels, where $m_x$ and $m_y$ are the scale factors relating pixels to distance and f is the focal length in terms of distance. The parameter $\gamma$ represents the skew coefficient between the x and the y axes, and is often 0. The parameters $u_0$ and $v_0$ represent the principal point, which may be 0 in the center of the image.

Each nearby light field image is transformed using, for example, the transformation provided above. The transformed light field image or a derivative of each such transformed light field image is embedded into the real world image captured by the mobile camera 100.

Figure 5:
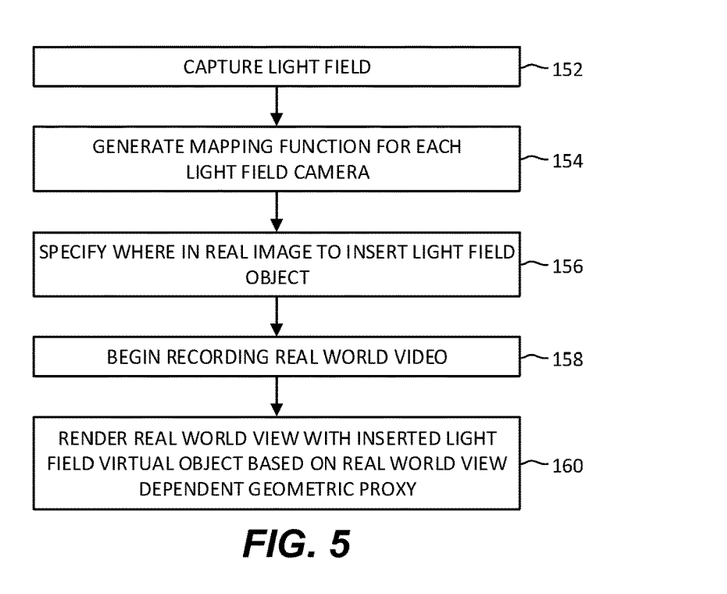
FIG. 5 shows a method by which a video frame is rendered with an inserted light field object based on a geometric proxy representation for the mobile camera in accordance with various embodiments.

FIG. 5 illustrates a method for generating AR or VR images in accordance with the disclosed embodiments. The operations in the example of FIG. 5 may be performed in the order shown, or in a different order. Further, two or more of the operations may be performed concurrently rather than sequentially.

At 152, the method includes capturing a light field. This operation may be performed as explained above. For example, the mobile camera 100 used to capture the real world scene into which the light field object is rendered can be used to also acquire the light field. The captured light field may be a series of still photographs or video sequences that are stored in memory of the mobile camera 100. In other embodiments, multiple light field cameras may be arranged in a circle, 2D array, or other arrangement and used to capture the light field. The captured light field of operation 152 may be performed ahead of time and stored in memory for subsequent use during the rendering process or may be performed concurrently with the real world image capture.

At 154, the method includes generating a mapping function for each light field camera (or at least the light field cameras that are nearby the mobile camera 100). The mapping function may contain a set of mapping values for each pixel in a given video frame. Each light field camera may have a mapping function that is a function of time and that specifies how the light field object is to be rendered into the real world scene. For example, if the light field object is opaque, the mapping function contains only one value for each pixel (0 or 1), which can be used as an alpha channel for alpha blending during rendering to make the resulting image look more realistic. A foreground/background segmentation module can be used to obtain the mapping function so that high values are assigned to pixels on targeted imposing foreground objects, and low values are assigned to background pixels that users do not want to show in the light field AR/VR experience. When the light field object has transparency, the mapping function contains the information about the outgoing ray direction (u,v) for environment matting.

At 156, the method includes specifying wherein the real world image to be acquired the user wants to have the light field object inserted. Specifying that location may be implemented by the user inputting a distance in front of the mobile camera 100 that is the location in the 3D space at which the light field object is to be rendered.

At 158, the mobile camera begins recording real world video. This operation may be initiated by the user pressing a "record" button on the mobile camera, or touching a record icon on a touch sensitive display of a mobile device such as a smart phone or table computer. The camera begins to record live images and, if desired, stores such images in memory.

At 160, the method includes rendering the real world view with the light field virtual object based on a real world view-dependent geometric proxy. The use of the geometric proxy associated with and computed by the mobile camera 100 enables the light field images to be processed and rendered into the images being captured by the mobile camera. More specifically, the geometric proxy is used to transform (i.e., distort) the light field images to cause them to appear closer to how they would have appeared had their light field camera been located at the current location of the mobile camera 100 and also facing the target object being recorded.

In some embodiments, operations 152, 154, and 158 may be the same device such as the mobile device 100 which may be implemented as a tablet device, smart phone, etc. as explained above. Further, operations 152 and 154 may be performed by a light field capture device or system and operation 158 may be performed by a different device. The captured light field thus may be captured ahead of time and used to be included into images acquired by a different device. Operation 156 and 160 may be performed by the same device that is used to record the real world video or by a different device such as a computer (e.g., server, laptop computer, etc.).

Figure 6:
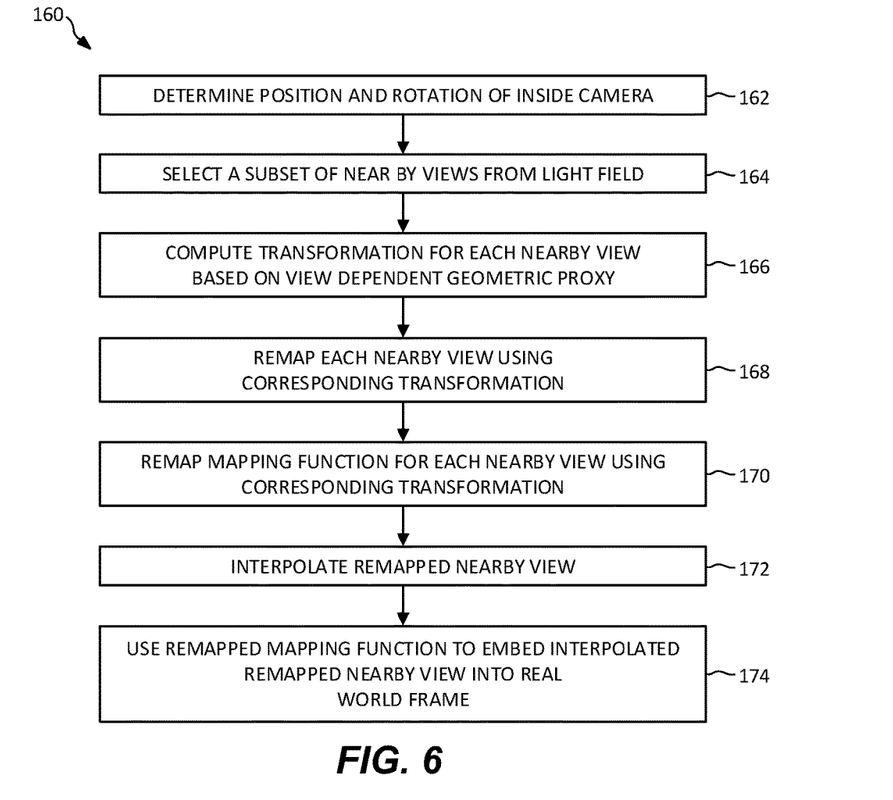
FIG. 6 shows an example of a method by which the views of nearby light field images are transformed based, in part, on the geometric proxy of the mobile camera in accordance with various embodiments.

FIG. 6 shows an example of the implementation of operation 160 in which rendering uses the geometric proxy of the mobile camera. The operations in the example of FIG. 5 may be performed in the order shown, or in a different order. Further, two or more of the operations may be performed concurrently rather than sequentially. The operations shown in FIG. 6 may be performed for each frame of video captured by the mobile camera 100 (e.g., 30 times per second) or at a different rate (e.g., for every other video frame).

At 162, the position and rotation of the mobile camera 100 is determined. These determinations may be performed by a SLAM technique, such as that described above, through use of accelerometers, gyroscopes, or by other techniques. The current position of the mobile camera is given as T(t) where t is the current time, and the current rotation of the mobile camera is R(t) as explained above.

Based on at least the current position and orientation of the mobile camera, nearby light field views are selected (164). This means that the locations are determined of the light field cameras that would have been closest to the current mobile camera's position and orientation had such light field cameras actually been present in the current 3D space when pointed toward the geometric proxy. For example, FIG. 4 illustrates two nearby light field cameras 70a and 70b. The selection as to which light field cameras are "nearby" may be based on a threshold distance. Those light field cameras that are within a threshold distance (fixed or configurable) are deemed to be nearby. In some cases, the current position of the mobile camera 100 may be coincident with one of the light field cameras 70. If the distance between a light field camera 70 and mobile camera 100 is less than another threshold (i.e., very close together), then only the view of that one light field camera is determined to be used in operation 164. For example, in FIG. 4 if mobile camera 100 is on top of (same location) as light field camera 70b, then only the view of light field camera 70b is used. In other cases, the mobile camera 100 is not on top of any light field camera position and the views of the two or more closest light field cameras are determined to be used in operation 164.

For each of the light field cameras determined to be nearby the current location of the mobile camera 100, the method includes at 166 computing a transformation for each such nearby view based on the view-dependent geometric proxy. An example of the transformation is provided above and is a function of the geometric proxy's current normal and distance values (distance from the geometric proxy to the mobile camera 100), the mobile device's current position T(t) and rotation R(t), the position and rotation of the light field camera whose view is being transformed, and the intrinsic camera matrix for that light field camera.

At 168, each such nearby view is remapped using the corresponding transformation computed for that light field camera at 166. In this operation, the actual image shown in the current video frame from that light field camera is altered per the transformation. The result is that the transformed image is made to appear more accurate to what the view would have looked like had the light field camera been located where the mobile camera 100 is currently located. At 170, the mapping function for each such nearby view also is remapped using the same transformation function determined at 166.

At 172, the remapped nearby views from operation 168 are interpolated to produce a single interpolated light field image. Various types of interpolation methods can be used such as linear interpolation. The remapped mapping functions also may be interpolated to produce a single interpolated mapping function.

At 174, the interpolated light field image is embedded into the real world view captured by the mobile camera. The corresponding interpolated mapping function also is used to generate the resulting image to further enhance the realism of the resulting image.

Figure 7:
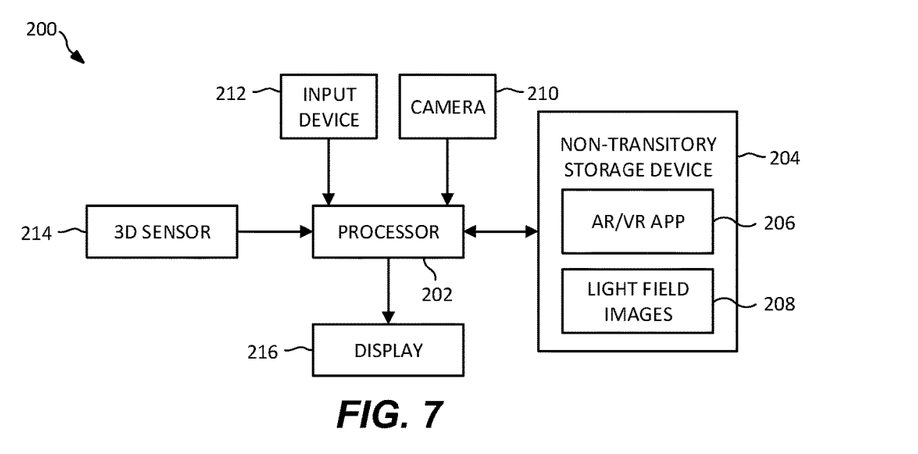
FIG. 7 shows a block diagram of mobile device usable to render video with inserted light field objects based on geometric proxies of the mobile device in accordance with various examples.

FIG. 7 shows an example of a block diagram of a mobile device 200 usable as described herein. The mobile device 200 includes a processor 202, a non-transitory storage device 204, a camera 210, an input device 212, a 3D sensor 21, and a display 216. The non-transitory storage device 204 may include volatile storage (e.g., random access memory), non-volatile storage (e.g., solid state storage, magnetic storage, optical storage, etc.), or a combination of both volatile and non-volatile storage. The non-transitory storage device 204 may be implemented as a single storage device or multiple storage devices. The non-transitory storage device 204 includes an AR/VR application 206 which comprises multiple instructions that are executable by processor 202. When executed, the AR/VR application 206 causes the processor 202 to perform some or all of the functions described above as attribute to the mobile camera.

The input device 212 may any type of user input device such as a keypad, keyboard, mouse, touchpad, etc. In an embodiment in which the mobile device 200 is an integrated computing device such as a smart phone, tablet device, and the like, the input device 212 and the display 216 may be implemented as a single touch sensitive display. The input device 212 in such embodiments may be the touch sensitive display itself. The 3D sensor 214 may include a single or multi-axis accelerometer, a single or multi-axis gyroscope, or any other type of 3D sensor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A mobile device, comprising:
   a processor;
   a camera coupled to the processor; and
   a storage device configured to store a plurality of light field views of a physical object;
   wherein the processor is configured to:
      select a subset of the plurality of light field views based on a user-specified distance from the mobile device;
      define a view-dependent geometric proxy at the user-specified distance from the mobile device, wherein an orientation of the view-dependent geometric proxy is based on a location and an orientation angle of the camera;
      transform each light field view from each of the selected subset of the light field views based on an intrinsic camera matrix defined for the mobile device, a three dimensional (3D) orientation angle associated with each light field view, a 3D location associated with each light field view, a 3D orientation angle of the mobile device, a 3D position of the mobile device, and a position and orientation of the view-dependent geometric proxy to produce transformed light field views;
      interpolate the transformed light field views to produce a light field virtual object;
      record images with the camera to produce recorded frames; and
      render the recorded frames with the light field virtual object that is adjusted based on the view-dependent geometric proxy as the mobile device moves.

2. The mobile device of claim 1, wherein the processor determines a new subset of light field views to select based on movement of the mobile device in 3D space.

3. The mobile device of claim 1, wherein the processor is further configured to:
   transform a mapping function for each of the selected subset of the light field views based on the view-dependent geometric proxy to produce transformed mapping functions;
   interpolate the transformed mapping functions to produce an interpolated mapping function; and
   render the recorded frames with the light field virtual object using the interpolated mapping function.

4. The mobile device of claim 1, further comprising an inertial measurement unit (IMU), wherein the processor determines the view-dependent geometric proxy based, in part, on sensor signals from the IMU.

5. The mobile device of claim 1, further comprising a touch sensitive display, wherein the processor receives a signal from the touch sensitive display indicating the user-specified distance from the mobile device as to where the light field virtual object is to appear to be located upon its insertion into the recorded frames captured by the mobile device.

6. The mobile device of claim 1, wherein the mobile device is a phone or tablet device.

7. A non-transitory storage device including instructions which, when executed by a processor, cause the processor to:
   store a plurality of light field views of a physical object;
   select a subset of the plurality of light field views based on a user-specified distance from a mobile device;

determine a view-dependent geometric proxy at the user-specified distance as the mobile device moves in three dimensional (3D) space, wherein an orientation of the view-dependent geometric proxy is based on a location and an orientation angle of a camera;

transform each light field view from each of the selected subset of the light field views based on an intrinsic camera matrix defined for the non-transitory storage device, a 3D orientation angle associated with each light field view, a 3D location associated with each light field view, a 3D orientation angle of the non-transitory storage device, a 3D position of the non-transitory storage device, and a position and orientation of the view-dependent geometric proxy to produce transformed light field views;

interpolate the transformed light field views to produce a light field virtual object;

receive video frames recorded by the camera; and render the video frames on a display with the light field virtual object that is adjusted based on the view-dependent geometric proxy as the mobile device moves.

8. The non-transitory storage device of claim 7, wherein the subset of light field views are selected from the plurality of light field views between locations at which the light field views are acquired and a current location of the camera.

9. The non-transitory storage device of claim 8, wherein the instructions, when executed by the processor, cause the processor to transform the subset of light field views based, at least in part, on a geometrical relationship between a position and the orientation of the geometric proxy and a position and orientation associated with the subset of light field views.

10. The non-transitory storage device of claim 7, wherein the instructions, when executed by the processor, cause the processor to receive an input from a user input device indicating a location in the video frames to insert the light field virtual object.

11. The non-transitory storage device of claim 7, wherein the instructions, when executed by the processor, cause the processor to determine the view-dependent geometric proxy based on an inertial simultaneous localization and mapping technique.

12. An augmented or virtual reality method implemented at a mobile device, comprising:

storing a plurality of light field views of a physical object;

selecting a subset of the plurality of light field views based on a user-specified distance from a mobile device;

receiving, via a user interface, an input as to a location to insert a light field object in images captured by a mobile camera;

recording video with the mobile camera to produce recorded video frames;

defining a view-dependent geometric proxy for the mobile camera at a user-specified distance from the mobile camera, wherein an orientation of the view-dependent geometric proxy is based on a location and an orientation angle of the mobile camera;

transforming each light field view from each of the selected subset of the light field views based on an intrinsic camera matrix defined for the mobile device, a three dimensional (3D) orientation angle associated with each light field view, a 3D location associated with each light field view, a 3D orientation angle of the mobile device, a 3D position of the mobile device, and a position and orientation of the view-dependent geometric proxy to produce transformed light field views;

interpolating the transformed light field views to produce a light field virtual object; and rendering the recorded video frames with the light field virtual object based on the view-dependent geometric proxy, wherein the rendering of the recorded video frames with the light field virtual object is adjusted as the mobile camera moves.

13. The method of claim 12, wherein rendering the recorded video frames with the inserted light field object includes:

determining a position and rotation of the mobile camera;

computing a transformation of each selected light field view of the selected subset of the light field views based on the view-dependent geometric proxy to produce a computed transformation for each of the selected light field views of the subset of the light field views;

remapping each of the subset of light field views using the computed transformation for each such selected light field view to produce remapped selected light field views;

generating a remapped nearby view using the remapped selected light field views; and embedding the remapped nearby view into the recorded video frames.

14. The method of claim 13, further comprising:

determining a mapping function for each frame of each selected light field view;

remapping each mapping function using the computed transformation to produce a transformed mapping function of each such mapping function; and combining the transformed mapping functions to produce a combined transformed mapping function, wherein rendering the recorded video frames with an inserted light field object includes applying the combined transformed mapping function to the remapped nearby view.

15. The method of claim 12, further comprising defining the geometric proxy for the mobile camera as a geometric shape located at a 3D coordinate origin and rotated based on a time varying orientation of the mobile camera.

16. The method of claim 15, wherein defining the geometric proxy for the mobile camera as a geometric shape comprises defining the geometric shape to be a plane.

* * * * *